United States Patent Office 2,867,719
Patented Jan. 6, 1959

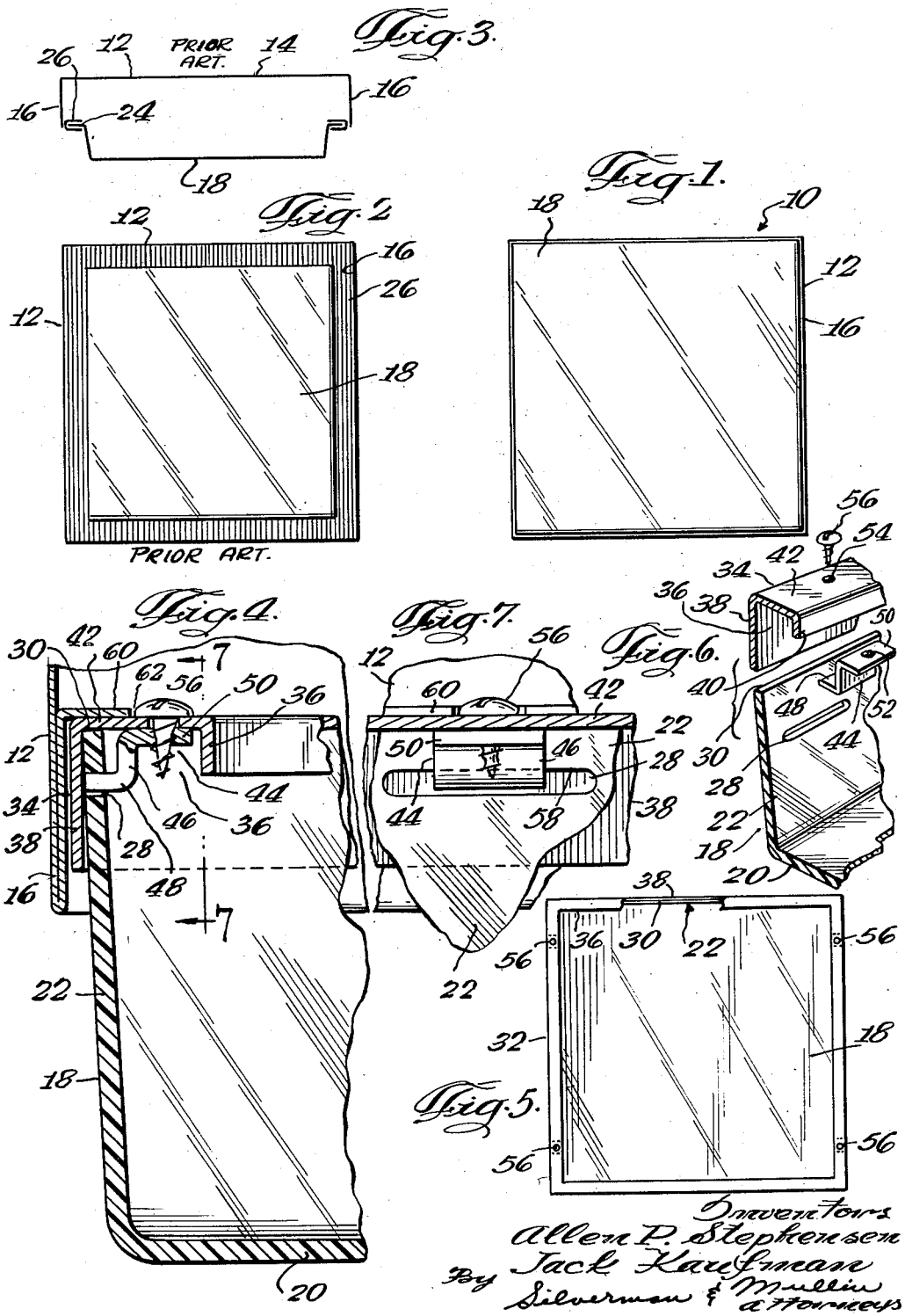

2,867,719
LIGHTING FIXTURES

Allan P. Stephensen and Jack Kaufman, Chicago, Ill., assignors to Compco Corporation, Chicago, Ill., a corporation of Illinois Application December 7, 1955, Serial No. 551,576

3 Claims. (Cl. 240—51.11)

This invention relates to improvements in lighting fixtures and more particularly it pertains to improvements in fluorescent lighting fixture housings whereby the lighting efficiency of the fixture is substantially increased.

It is well known that fluorescent lighting fixtures are ordinarily constructed with a metal housing member in which are positioned the electrical components of the fixture including the fluorescent tubes, the wiring and the transformer ballasts. The open end of the housing member is ordinarily closed by a light diffusion panel which serves both as a closure member for the housing and as a means for diffusing the light emanating from the fluorescent tubes.

Since the light rays are diffused in all directions but primarily directed downwardly to light the interior of the room in which the fixture is positioned, the efficiency of the fixture is to a large extent determined by the percentage of light-diffusing area of the diffusion panel. Thus optimum efficiency is achieved only with a fixture in which there is maximum light-diffusing area in the diffusion panel.

Heretofore lighting fixtures have been designed and constructed with a considerable percentage of the total diffusion panel area exposed to the passage of light therethrough. However, invariably a substantial portion of the diffusion panel was necessarily masked, thereby preventing the diffusion of light therethrough. The masked portion of the diffusion panel usually comprised a marginal flange which was retained in a metal channel for the purpose of supporting the panel in the fixture housing. Although the lighting efficiency of the fixture was admittedly thereby reduced, heretofore this was the only practical structure providing the necessary support means for the diffusion panel.

It is an important object of this invention to provide a lighting fixture which will overcome all of the disadvantages mentioned hereinabove.

Another object is to provide a lighting fixture housing in which maximum lighting efficiency is attained. An object relating thereto is to afford a lighting fixture housing in which substantially the total area of the diffusion panel is exposed for the passage of light therethrough.

A further object is to afford a lighting fixture in which the entire area, as viewed from the floor, is lighted and transmits light rays therethrough so that no darkened border or similar areas are present.

Still another object is to provide a lighting fixture in which the light diffusion member may be positioned with its sides adjacent to, and in close proximity with the sides of the housing member.

Still a further object is to afford a lighting fixture in which the diffusion panel framework is substantially concealed and does not mask any visible portion of the light diffusion panel.

Yet another object is to provide novel but effective means for supporting a light-diffusing member in a lighting fixture housing, without such means masking any substantial portion of the diffusion panel.

Yet a further object is to afford a lighting fixture of maximum lighting efficiency and substantially greater attractiveness than heretofore achieved.

Yet another object is to afford an improved lighting fixture of the character described of simple inexpensive construction, yet attractive, sturdy and efficient.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a diagrammatic plan view of a fixture embodying the principles of our invention installed on the ceiling of a room, as viewed from the bottom thereof;

Fig. 2 is a similar diagrammatic view of a fixture illustrating the prior art;

Fig. 3 is a diagrammatic side elevational view of the same;

Fig. 4 is a fragmentary sectional view illustrating certain details of construction;

Fig. 5 is a plan view as viewed from the top of the diffusion panel and frame assembly;

Fig. 6 is a fragmentary exploded view partially in section illustrating the details of construction revealed in Fig. 4 of the drawings; and Fig. 7 is a fragmentary sectional view taken on the plane of line 7—7 of Fig. 4 of the drawings, viewed in the direction indicated, and again illustrating the details of construction illustrated in Figs. 4 and 6 of the drawings.

Referring first to Fig. 1 of the drawings, reference numeral 10 indicates generally a lighting fixture which may include a metal housing member 12. As illustrated in Fig. 3 of the drawings, the housing 12 is in turn comprised of a top wall 14 with integrally formed depending side walls such as 16 which define an enclosure opening to the bottom thereof. This enclosure or housing may be closed by a light diffusion panel member such as 18.

The diffusion panel member 18, as shown in Fig. 4 of the drawings, is cup-shaped with a bottom wall 20 and integrally formed side wall members 22. Obviously the diffusion panel member 18 must be capable of transmitting light therethrough and is therefore formed of a translucent or transparent material, preferably a translucent material such as plastic or glass. In the embodiment chosen for illustration, the material of composition is a translucent plastic.

Since the diffusion panel 18 also serves as a closure member for the housing 12, it should be apparent that the closure member must be so mounted as to permit ready access to the interior of the housing 12 wherein may be positioned the various electrical components including fluorescent tubes which require replacement from time to time. This is usually accomplished by providing a hinged mounting with a locking device which may be in the nature of a latch of the type disclosed in the co-pending patent application of Jack Kaufman, Serial No. 486,089 filed February 4, 1955, and assigned to the common assignee of the subject application.

It should also be apparent that means must be provided to support the panel 18 within the housing 12. Heretofore this has been accomplished in the following manner. The diffusion panel 18 was provided with a marginal outwardly protruding flange 24 designed to fit within a channel-shaped framework 26. The framework was hingedly affixed to the housing wall 16 thereby retaining and supporting the panel 18.

Although this type of construction was suitable for supporting the panel in the housing, it will be noted in Figs. 2 and 3 of the drawings that the flange portion, namely 24 of the panel 18, was incapable of transmitting light therethrough since the same was masked by the metal channel 26 within which it was enclosed. Obviously this reduced the amount of light-transmitting area thereby adversely affecting the lighting efficiency of the fixture. Moreover, the appearance of the fixture was adversely affected by this construction.

To overcome the disadvantages of the above-described construction, the structure illustrated in Figs. 1 and 4–7 inclusive of the drawings has been provided. It will be noted that in our improved structure, the side walls 22 of the panel 18 are formed in substantially vertical, but slightly inclined, planes without any horizontally disposed marginal flange such as 24 of the previously described prior art panel structure. A plurality of elongated slots such as 28 may be formed in the panel walls 22 positioned in spaced relationship with the top edge 30 of the walls. The purpose of these slots will become apparent as the description proceeds.

A frame 32 constructed of channel-shaped members such as 34 in which a downwardly opening cavity 36 defined by a pair of vertical walls 38 and 40 integrally formed with a horizontally disposed wall 42, may be provided. The frame 32 is designed to encircle the panel 18 with the upper marginal edges of the wall 22 fitting into the channel cavity 36.

A Z-shaped retaining element such as 44 may be provided having a vertical segment 46 with a pair of horizontal leg segments such as 48 and 50 integrally formed therewith; said horizontal leg segments extending outwardly in opposite directions from the vertical segment 46. The horizontal segment 48 is designed to loosely fit within the slot 28 formed in the panel wall 22. The horizontal leg segment 50 may be formed at the top of the vertical segment 46 with an internally-threaded opening such as 52 formed therethrough. This opening may be aligned with an opening 54 formed in the horizontal wall 42 of the channel 34, so that a headed screw such as 56 may be used to secure the mounting member 44 to the frame 32. Obviously the horizontal leg member 48 of the mounting means 44 bearing against the top edge 58 of the slots 28 supports the diffusion panel member 18, as shown in Figs. 4 and 7 of the drawings. Although the number of retaining elements may be varied, we have found four to be sufficient.

It should be noted that in this construction no portion of the panel which is exposed or protrudes below the bottom edge of the housing wall 16 is masked by the supporting means. Furthermore it will be noted that the diffusion panel wall 18 may be positioned adjacent to, and in close relationship with, the fixture wall 16 rather than spaced apart by the flanges 24 as in the prior art fixtures.

The frame 32 may be hingedly mounted in the fixture housing 12 in any conventional manner, as, for example, the manner revealed in the previously mentioned copending application. Although the aforementioned structure is not disclosed in the present application, it will be noted that a mounting ledge such as 60 may be formed or affixed to the housing wall 16 in spaced relationship with the bottom edge thereof. It is to this mounting ledge that the frame 32 may be hingedly mounted and latched. For the purpose of insuring proper positioning of the frame 32 within the fixture, openings such as 62 may be provided for accommodating freely therein the heads of the screws 56.

From the foregoing description and drawings it should be apparent that we have provided a lighting fixture having novel means for mounting a translucent or transparent diffusion panel member in such a manner that none of the exposed portion of said panel member is masked against the transmission of light therethrough. This is accomplished without substantially weakening the securing means or supporting structure, but does in fact materially increase the lighting efficiency of the fixture. Moreover, the appearance of the fixture is materially improved without affecting the closure function of the light diffusing panel. Thus the panel may be easily and conveniently opened to provide ready access to the electrical components within the housing itself.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. In a fluorescent lighting fixture; an opaque housing having a top wall and a plurality of depending walls defining a cavity for mounting therein electrical components including fluorescent lighting tubes, a translucent light diffusing member having a bottom wall and upwardly protruding flangeless side walls, a frame of channel-shaped cross-section mounted with the upper marginal edges of said diffusing member side-walls positioned in said channels, said diffusing member side-walls formed with a plurality of slots, said slots spaced one from the other and positioned in spaced relationship with the top edges of said side-walls, and retaining elements positioned inside said cavity, said retaining elements cooperating with said slots to removably support said diffusing member in optimum light diffusing unmasked relationship, said diffusing member side-walls positioned in close proximity to the side-walls of the housing, each of said retaining elements comprising a Z-shaped device having one horizontal leg adapted to loosely fit within said slot and the other leg affixed to said frame.

2. In a fluorescent lighting fixture; an opaque housing having a top wall and a plurality of depending walls defining a cavity for mounting therein electrical components including fluorescent lighting tubes, a translucent light diffusing member having a bottom wall and upwardly protruding flangeless side walls, a frame of channel-shaped cross-section mounted with the upper marginal edges of said diffusing member side-walls positioned in said channels, said diffusing member side-walls formed with a plurality of slots, said slots spaced one from the other and positioned in spaced relationship with the top edges of said side-walls, and retaining elements positioned inside said cavity, said retaining elements cooperating with said slots to removably support said diffusing member in optimum light diffusing unmasked relationship, said diffusing member side-walls positioned in close proximity to the side-walls of the housing, each of said retaining elements comprising a device having a portion adapted to protrude into said slot and another portion affixed to said frame.

3. In a lighting fixture; an opaque housing having a top wall and a plurality of depending walls defining a cavity for mounting therein electrical components, a translucent light diffusing member having a bottom wall and upwardly protruding side walls, a frame mounted on the upper marginal edges of said diffusing member side walls, upper portions of said diffusing member side walls formed with a plurality of spaced-apart slots, and retaining elements positioned inside said cavity, said retaining elements cooperating with said slots to removably support said diffusing member in optimum light diffusing unmasked relationship, said diffusing member side walls positioned in close proximity to the side walls of the housing, each of said retaining elements comprising a bracket having two legs, one leg adapted to protrude into said slot and another leg affixed to said frame.

References Cited in the file of this patent

UNITED STATES PATENTS

| | | | |
|---|---|---|---|
| 2,170,189 | Doane | Aug. 22, | 1939 |
| 2,309,038 | Biller | Jan. 19, | 1943 |
| 2,312,393 | Donnelly | Mar. 2, | 1943 |
| 2,694,775 | Florence | Nov. 16, | 1954 |

FOREIGN PATENTS

| | | | |
|---|---|---|---|
| 149,649 | Australia | Jan. 14, | 1953 |